(12) United States Patent
Nagashima

(10) Patent No.: US 9,689,449 B2
(45) Date of Patent: Jun. 27, 2017

(54) FRICTION MATERIAL

(71) Applicant: Nisshinbo Brake, Inc., Tokyo (JP)

(72) Inventor: Jun Nagashima, Gunma-ken (JP)

(73) Assignee: Nisshinbo Brake, Inc., Tokyo (JP)

( * ) Notice: Subject to any disclaimer, the term of this patent is extended or adjusted under 35 U.S.C. 154(b) by 0 days.

(21) Appl. No.: 15/303,500

(22) PCT Filed: Apr. 13, 2015

(86) PCT No.: PCT/JP2015/061365
§ 371 (c)(1),
(2) Date: Oct. 11, 2016

(87) PCT Pub. No.: WO2015/159848
PCT Pub. Date: Oct. 22, 2015

(65) Prior Publication Data
US 2017/0030426 A1    Feb. 2, 2017

(30) Foreign Application Priority Data

Apr. 17, 2014 (JP) ................................ 2014-085630

(51) Int. Cl.
*C09K 3/14* (2006.01)
*F16D 69/02* (2006.01)

(52) U.S. Cl.
CPC .............. *F16D 69/026* (2013.01); *C09K 3/14* (2013.01); *F16D 69/02* (2013.01)

(58) Field of Classification Search
CPC ......... C09K 3/14; F16D 69/02; F16D 69/023; F16D 69/026
See application file for complete search history.

(56) References Cited

U.S. PATENT DOCUMENTS

| 7,045,207 | B2 * | 5/2006 | Huner | C04B 35/83 428/293.1 |
| 7,740,698 | B2 * | 6/2010 | Kitami | F16D 69/026 106/36 |
| 8,057,591 | B2 * | 11/2011 | Yaguchi | F16D 69/026 106/36 |
| 2008/0156226 | A1 * | 7/2008 | Kitami | F16D 69/026 106/36 |
| 2015/0275996 | A1 * | 10/2015 | Trombotto | F16D 69/026 523/157 |
| 2016/0289126 | A1 * | 10/2016 | Kitami | F16D 69/026 |

FOREIGN PATENT DOCUMENTS

| JP | 2007-56063 A | * | 3/2007 |
| JP | 2008-174705 A | * | 7/2008 |
| JP | 2009-1715 A | * | 1/2009 |
| JP | 2012-255052 | | 12/2012 |
| JP | 2012-255053 | | 12/2012 |

\* cited by examiner

*Primary Examiner* — Anthony J Green
(74) *Attorney, Agent, or Firm* — Tracy M. Heims; Apex Juris, pllc.

(57) ABSTRACT

To provide a low-cost friction material which is able to secure the required braking performance, the fading resistance, the wear resistance, and the adhesive strength between the friction material and the back plate while satisfying laws and regulations relating to the required amount of the content of the copper component contained therein. The friction material for the disc brake pad which is manufactured by forming a non-asbestos-organic (NAO) friction material composition that includes no copper component, in which the friction material composition includes no titanate but includes (a) 8-15 volume % of an inorganic friction modifier having the average particle diameter of 0.5-20 μm and the Mohs hardness of 5-8 relative to a total amount of the friction material composition, (b) 1-3 volume % of a porous inorganic friction modifier having a micro porous structure relative to the total amount of the friction material composition, and (c) 5-10 volume % of a carbonaceous lubricant, where the carbonaceous lubricant includes 2-4 volume % of coke relative to the total amount of the friction material composition, the average particle diameter of the coke is 300-800 μm while the content of the inorganic friction modifier (a), (b), and the carbonaceous lubricant (c) satisfies the following formula: $1.0 \leq ((a)+(b))/(c) \leq 2.5$.

2 Claims, No Drawings

FRICTION MATERIAL

DETAILED DESCRIPTION OF THE INVENTION

Field of the Invention

This invention relates to a friction material for a disc brake pad of an automobile or the like, which is manufactured by forming a non-asbestos-organic (NAO) friction material composition.

BACKGROUND OF THE INVENTION

Conventionally, a disc brake is used as a brake device of an automobile, and a disc brake pad manufactured by fixing the friction material on a metallic base member is used as a friction member of the disc brake.

The friction material is classified into three types, i.e., a semi-metallic friction material containing, as a fiber base material, 30 weight % or more but less than 60 weight % of a steel fiber relative to the total amount of the friction material composition, a low steel friction material containing a steel fiber in a part of the fiber base material as well as less than 30 weight % of the steel fiber relative to the total amount of the friction material composition, and the NAO friction material containing no steel fiber and steel-based fiber such as a stainless steel fiber.

In the late years where the friction material causing less braking noise is in demand, the trend is to use the disc brake pad that utilizes the NAO friction material which mainly contains a binder, a fiber base material, a lubricant, an inorganic friction modifier, an organic friction modifier, pH adjuster, and a filler, and which contains no steel fiber and no steel-based fiber but contains a titanate.

For the NAO friction material for the disc brake pad, in order to secure the required performance, about 5-20 weight % of a copper component such as fibers and/or particles of copper and/or copper alloy in total relative to the total amount of the friction material composition, is added as a necessary component for the NAO friction material composition.

However, recently, the above-described friction material including the copper component, when braking, discharges the copper as an abrasion powder, and it is suggested that the discharged copper flows into a river, lake, and/or ocean and then the copper possibly contaminates a body of water.

Because of these backgrounds, for example, California State (CA) and Washington State (WA) of the United States of America passed a bill to prohibit the sales of the friction member using the friction material containing 5 weight % or more of the copper component relative to the total amount of the friction material composition and an act of assembling the subject friction material in a new car from the year of 2021 and to prohibit the sales of the friction member using the friction material containing 0.5 weight % or more of the copper component relative to the total amount of the friction material composition and an act of assembling the subject friction material in a new car either from 2023 or later or 2025 or later.

Then, a developmental study of the friction material that satisfies the laws and regulations of copper content restriction while securing a required performance for the friction material has been proceeding.

The Patent Document 1 discloses a disc brake pad using a NAO friction material composition that includes a binder, an organic filler, an inorganic filler and a fiber base, in which a copper content in the friction material composition is 5 mass % or less as a copper element, a metal fiber content other than a copper and copper alloy is 0.5 mass % or less, a titanate and a zirconium oxide with a particle diameter of 30 μm or less is included, the titanate content is 10-30 mass %, and the zirconium oxide with a particle diameter of over 30 μm is not included substantially.

The Patent Document 2 discloses a disc brake pad using a (NAO) friction material composition that includes a binder, an organic filler, an inorganic filler and a fiber base, in which a copper content in the friction material composition is 5 mass % or less as a copper element, a metal fiber content other than a copper and copper alloy is 0.5 mass % or less, a titanate and zinc powder are included, and the titanate content is 10-35 mass %.

As in the Patent Document 1 and the Patent Document 2, when relatively larger amount of the titanate such as the potassium titanate and lithium potassium titanate is added to the non-asbestos-organic (NAO) friction material, a transfer layer of the titanate is formed on a sliding surface of the disc rotor as a contacting member when braking the disc rotor with the friction material, and an adhesive friction occurs between the transfer layer and the titanate existing on the friction material surface, thereby obtaining the friction material that enables to secure the sufficient friction coefficient and effective braking performance even if the copper component is reduced.

However, the titanate is an expensive material for the friction material, and there is a problem of not being able to offer a low cost friction material when using the technology disclosed in the Patent Document 1 and the Patent Document 2.

PRIOR ARTS

Patent Documents

[Patent Document 1] Japanese Provisional Patent Publication No. 2012-255052
[Patent Document 2] Japanese Provisional Patent Publication No. 2012-255053

SUMMARY OF INVENTION

Problems to be Resolved by the Invention

An object of this invention is to provide a friction material used for a disc brake pad, which is manufactured by forming a NAO friction material composition, in which the friction material is able to secure required braking performance, fading resistance, wear resistance, and the adhesive strength between the friction material and the back plate, the product appearance thereof is good, and the cost thereof is low while satisfying laws and regulations relating to the required amount of the content of the copper component contained therein.

Means to Resolve the Problems

The inventor, after serous investigation, completed this invention as finding that the above-identified problem, for the friction material manufactured by forming the NAO friction material composition including no copper component, may be resolved by using the frictional material composition that includes no titanate but includes the inorganic friction modifier with the predetermined particle diameter and Mohs hardness, the porous inorganic friction modifier having the micro porous structure, and the carbonaceous lubricant, where the predetermined amount of coke is included in a part of the carbonaceous lubricant.

This invention relates to the friction material manufactured by forming the NAO friction material composition including no copper component, which is used for the disc brake pad, and is based on the following technical features (1) A friction material for a disc brake pad, which is manufactured by forming a NAO friction material composition including no copper component, in which the friction material composition includes no titanate, (a) 8-15 volume % of an inorganic friction modifier having an average particle diameter of 0.5-20 μm and the Mohs hardness of 5-8 relative to a total amount of the friction material composition, (b) 1-3 volume % of a porous inorganic friction modifier having a micro porous structure relative to the total amount of the friction material composition, and (c) 5-10 volume % of a carbonaceous lubricant, where the carbonaceous lubricant includes 2-4 volume % of coke relative to the total amount of the friction material composition, and an average particle diameter of coke is 300-800 μm while the content of the inorganic friction modifier (a), (b), and the carbonaceous lubricant (c) satisfies a following formula: $1.0 \leq ((a)+(b))/(c) \leq 2.5$.

(2) The friction material according to (1), in which the porous inorganic friction modifier having the micro porous structure is zeolite.

Advantage of the Invention

This invention is able to provide the friction material used for the disc brake pad, manufactured by forming the NAO friction material composition, in which the friction material is able to secure the required braking performance, the fading resistance, the wear resistance, and the adhesive strength between the friction material and the back plate, and at the same time, the product appearance thereof is good and the cost thereof is low, while satisfying laws and regulations relating to the required amount of the content of the copper component contained therein.

EMBODIMENTS OF THE INVENTION

According to this invention, in order to improve the braking performance, 8-15 volume % of an inorganic friction modifier relative to a total amount of a friction material composition having the average particle diameter of 0.5-20 μm and the Mohs hardness of 5-8 is added therein.

The friction material to which 8-15 volume % of the inorganic friction modifier, relative to the total amount of the friction material composition, having the average particle diameter of 0.5-20 μm and Mohs hardness of 5-8, is added, when the friction material frictionally contacts to the disc rotor as the contacting member in the braking action, the inorganic friction modifier moderately grinds the sliding surface of the disc rotor, thereby causing the transfer of the grinded powder of the cast iron on the friction surface of the friction material.

A further braking action causes an adhesive friction between the cast iron component transferred onto the friction surface of the friction material and the sliding surface of the disc rotor, thereby obtaining the friction material that enables to secure the sufficient friction coefficient and effective braking performance.

The inorganic friction modifier with the Mohs hardness of 5-8 may be one material or any combination of the two or more materials selected from such as a magnesium oxide, a γ-alumina, a triiron tetroxide, a zirconium silicate, and a zirconium oxide.

Also, the Mohs hardness used as the standard in this invention is an old Mohs hardness represented by (1) talc, (2) gypsum, (3) calcite, (4) fluorite, (5) apatite, (6) orthoclaes, (7) quartz, (8) topaz, (9) corundum, and (10) diamond.

Also, this invention, as an average particle diameter, uses a particle diameter (D50) measured by a laser diffraction method.

Furthermore, a decrease of the fading resistance caused due to elimination of the titanate from the friction material is suppressed by adding 1-3 volume % of the porous inorganic friction modifier having the micro porous structure relative to the total amount of the friction material composition.

The porous inorganic friction modifier having the micro porous structure may be one material or two materials selected from such as a zeolite and a micro porous alumina; However, it is preferable to use the zeolite alone as the porous inorganic friction modifier.

As described above, in order to obtain the sufficient braking performance without decreasing the fading resistance, the relatively small inorganic friction modifier with the average particle diameter of 0.5-20 μm and the porous inorganic friction modifier having the micro porous structure are utilized in this invention.

As these materials have large specific surface area, they require a large amount of binder so as to bind these materials.

The binder contributes to the improvement of the adhesive strength between the friction material and the back plate; however, if large amount of raw materials with large specific surface areas are used in the friction material, the amount of the binder may become insufficient to secure necessary adhesive strength between the friction material and the back plate, thereby tending to reduce the adhesive strength therebetween.

Accordingly, in this invention, 2-4 volume % of the coke with the average particle diameter of 300-800 μm in a portion of the carbonaceous lubricant relative to the total amount of the friction material composition is added.

The coke with relatively large diameter has the small specific surface area, and adding an appropriate amount of the same controls the consumption of the binder to bind the raw materials together and suppress the reduction of the adhesive strength between the friction material and the back plate.

In addition, so as to balance the braking performance, the fading resistance, and the wear resistance, 5-10 volume % of the total amount of the above-described coke and the carbonaceous lubricant other than the above-described coke relative to the total amount of the friction material composition are added, while the friction material composition includes (a) 8-15 volume % of an inorganic friction modifier having an average particle diameter of 0.5-20 μm and the Mohs hardness of 5-8 relative to the total amount of the friction material composition, (b) 1-3 volume % of a porous inorganic friction modifier having a micro porous structure relative to the total amount of the friction material composition, and (c) the carbonaceous lubricant, in which the carbonaceous lubricant (c) satisfies the formula of $1.0 \leq ((a)+(b))/(c) \leq 2.5$.

The carbonaceous lubricant other than the above-described coke may be such as natural graphite, artificial graphite, and expanded graphite, and one or any combination of two or more of these materials may be used.

The friction material of this invention includes the friction material composition having the above-described inorganic friction modifier with the average diameter of 0.5-20 μm and Mohs hardness of 5-8, the porous inorganic friction modifier having the micro porous structure, the carbonaceous lubricant, as well as components that are usually used for the friction material such as the binder, the fiber base, the lubricant, the inorganic friction modifier, the organic friction modifier, the pH modifier, and the filler.

The binder may be one material or any combination of the two or more materials, which may be conventionally used for the friction material, selected from such as the straight phenolic resin, the resin obtained by modifying the phenolic resin with various elastomers such as cashew oil, silicone oil, and acrylic rubber, the aralkyl modified phenolic resin obtained by reacting the phenols with aralkyl ethers and aldehydes, and the thermosetting resin dispersing such as various elastomers and fluoropolymer in the phenolic resin. The content of the binder is preferably 10-20 volume % relative to the total amount of the friction material composition but more preferably 12-15 volume % relative to the total amount of the friction material composition.

The fiber base may be one organic fiber or any combination of the two or more organic fibers, which may be conventionally used for the friction material, selected from such as the aramid fiber, the cellulosic fiber, the poly-p-phenylenebenzobisoxazole (PBO) fiber, and the acrylic fiber. The content of the fiber base is preferably 3-10 volume % relative to the total amount of the friction material composition but more preferably 4-8 volume % of the total amount of the friction material composition.

In addition to the above-described carbonaceous lubricant, the lubricant may be one metal sulfide type lubricant or any combination of two or more metal sulfide type lubricant selected from such as the molybdenum disulfide, the zinc sulfide, the tin sulfide, and composite metal sulfide. The metal sulfide type lubricant is preferably 0-3 volume % relative to the total amount of the friction material composition but more preferably 1-2 volume % relative to the total amount of the friction material composition.

The inorganic friction modifier may be one material or any combination of two or more materials selected from the particulate inorganic friction modifiers such as the talc, the mica, the vermiculite, and the dolomite plaster and the fibrous inorganic modifier such as the wollastonite, the sepiolite, the basalt fiber, the grass fiber, the biosoluble artificial mineral fiber, rock wool other than the above-described inorganic friction modifier having the average particle diameter of 0.5-20 m and Mohs hardness of 5-8 and the porous inorganic friction modifier having the micro porous structure.

The content of the inorganic friction material in the total amount of the above-described inorganic friction modifier having the average particle diameter of 0.5-20 μm and Mohs hardness of 5-8 together and the above-described porous inorganic friction modifier having the micro porous structure is preferably 18-30 volume % relative to the total amount of the friction material composition but more preferably 20-25 volume % relative to the total amount of the friction material composition.

The organic friction modifier may be one material or any combination of two or more materials selected from the organic friction modifiers that may be conventionally used for the friction material such as the cashew dust, the vulcanized powders of the tire tread rubber and the unvulcanized rubber powders or the vulcanized rubber powders such as the nitrile rubber, the acrylic rubber, the silicone rubber, and the butyl rubber.

The content of the organic friction modifier is preferably 10-25 volume % relative to the total amount of the friction material composition but more preferably 15-20 volume % relative to the total amount of the friction material composition.

The pH adjuster may be a conventionally used pH adjuster for the friction material such as the calcium hydroxide.

The pH adjuster is preferably 4-8 volume % relative to the total amount of the friction material composition but more preferably 5-7 volume % relative to the total amount of the friction material composition.

The filler such as the barium sulfate and the calcium carbonate as the remaining portion of the friction material composition.

The friction material of this invention used for the disc brake is manufactured through a mixing step to obtain a raw friction material mixture by uniformly mixing the predetermined amount of the friction material composition using a mixer, a heat press forming step to obtain a molded product by heat press forming the raw friction material mixture positioned in the heat forming die superposed on the separately pre-cleaned, surface treated, and adhesive applied back plate, a heat treatment step of heating the molded product to complete the cure reaction of the binder thereon, a coating step of applying the coating thereon, a baking step of baking the coating thereon, and a grinding step of forming the friction surface by a rotary grinding wheel.

After the heat press forming step, instead of above described separated heat treatment step, coating step and baking step, the heat treatment process combining above mentioned three steps and the girding step after that step may be adopted to manufacture the friction material.

As necessary, prior to the heat press forming step, the granulation step of granulating the raw friction material mixture, the kneading step of kneading the raw friction material mixture, and the pre-forming step of forming an unfinished preformed article by positioning the raw friction material mixture, the granulated raw friction material mixture obtained through the granulation step or the kneaded raw friction material mixture obtained through the kneading step into the pre-forming die, are performed. In addition, after the heat press forming step, the scorching step may be performed.

Embodiments

In the following sections, the embodiments and the comparative examples are disclosed to concretely explain this invention; however, this invention is not limited to the following embodiments.

The Manufacturing Method of the Friction Material of Embodiments 1-10/Comparative Examples 1-9

Each friction material composition shown in TABLE 1 and TABLE 2 is mixed for 5 minutes by the Loedige mixer and is pressed in the forming die under 30 MPa for 10 seconds to form the pre-forming article. This unfinished pre-forming article is superposed on the pre-cleaned, surface treated, adhesive coated steel back plate to form for 10 minutes in the heat press forming die at the forming temperature of 150 centigrade under the forming pressure of 40 MPa, to heat treatment (post-curing) for 5 hours at 200 centigrade, and to grind to form the friction surface for the disc brake pad of the passenger car (Embodiments 1-10 and Comparative Examples 1-9).

TABLE 1

| | | | Embodiments | | | | | | | | | |
|---|---|---|---|---|---|---|---|---|---|---|---|---|
| | | | 1 | 2 | 3 | 4 | 5 | 6 | 7 | 8 | 9 | 10 |
| Binder | Straight Phenolic Resin | | 14.0 | 14.0 | 14.0 | 14.0 | 14.0 | 14.0 | 14.0 | 14.0 | 14.0 | 14.0 |
| Fiber Base | Aramid Fiber | | 5.0 | 5.0 | 5.0 | 5.0 | 5.0 | 5.0 | 5.0 | 5.0 | 5.0 | 5.0 |
| Inorganic Friction Modifier | Zirconium Silicate (Average Particle Diameter = 0.3 μm) Mohs Hardness = 7.5 | | | | | | | | | | | |
| | Zirconium Silicate (Average Particle Diameter = 0.5 μm) Mohs Hardness = 7.5 | (a) | | | 6.0 | | | | | | | |
| | Zirconium Silicate (Average Particle Diameter = 10 μm) Mohs Hardness = 7.5 | (a) | 6.0 | 6.0 | | | 2.5 | 9.5 | 5.0 | 9.0 | 6.0 | 6.0 |
| | Zirconium Silicate (Average Particle Diameter = 20 μm) Mohs Hardness = 7.5 | (a) | | | | 6.0 | | | | | | |
| | Zirconium Silicate (Average Particle Diameter = 30 μm) Mohs Hardness = 7.5 | | | | | | | | | | | |
| | Activated Alumina (Average Particle Diameter = 10 μm) Mohs Hardness = 6 | (a) | 5.0 | 5.0 | 5.0 | 5.0 | 5.0 | 5.0 | 5.0 | 5.0 | 5.0 | 5.0 |
| | Black Iron Oxide (Average Particle Diameter = 1 μm) Mohs Hardness = 6.5 | (a) | 0.5 | 0.5 | 0.5 | 0.5 | 0.5 | 0.5 | 0.5 | 0.5 | 0.5 | 0.5 |
| | Silicon Carbide (Average Particle Diameter = 10 μm) Mohs Hardness = 9 | | | | | | | | | | | |
| | Zeolite | (b) | 2.0 | | 2.0 | 2.0 | 1.0 | 3.0 | 2.0 | 2.0 | 2.0 | 2.0 |
| | Micro Porous Alumina | (b) | | 2.0 | | | | | | | | |
| | Muscovite | | 6.0 | 6.0 | 6.0 | 6.0 | 6.0 | 6.0 | 6.0 | 6.0 | 6.0 | 6.0 |
| | Unbaked Vermiculite | | 3.0 | 3.0 | 3.0 | 3.0 | 3.0 | 3.0 | 3.0 | 3.0 | 3.0 | 3.0 |
| Carbon Type Lubricant | Artificial Graphite | (c) | 5.0 | 5.0 | 5.0 | 5.0 | 5.0 | 5.0 | 2.0 | 6.0 | 5.0 | 5.0 |
| | Petroleum Coke (Average Particle Diameter = 100 μm) | | | | | | | | | | | |
| | Petroleum Coke (Average Particle Diameter = 300 μm) | (c) | | | | | | | | | 3.0 | |
| | Petroleum Coke (Average Particle Diameter = 450 μm) | (c) | 3.0 | 3.0 | 3.0 | 3.0 | 3.0 | 3.0 | 3.0 | 4.0 | | |
| | Petroleum Coke (Average Particle Diameter = 800 μm) | (c) | | | | | | | | | | 3.0 |
| | Petroleum Coke (Average Particle Diameter = 1000 μm) | | | | | | | | | | | |
| Metal Sulfide Type Lubricant | Molybdenum Disulfide | | 1.0 | 1.0 | 1.0 | 1.0 | 1.0 | 1.0 | 1.0 | 1.0 | 1.0 | 1.0 |
| Organic Friction Modifier | Cashew Dust | | 12.0 | 12.0 | 12.0 | 12.0 | 12.0 | 12.0 | 12.0 | 12.0 | 12.0 | 12.0 |
| | Tire Tread Rubber Vulcanized Powder | | 6.0 | 6.0 | 6.0 | 6.0 | 6.0 | 6.0 | 6.0 | 6.0 | 6.0 | 6.0 |
| pH Adjuster | Calcium Hydroxide | | 6.0 | 6.0 | 6.0 | 6.0 | 6.0 | 6.0 | 6.0 | 6.0 | 6.0 | 6.0 |
| Remaining Components | Barium Sulfate | | 25.5 | 25.5 | 25.5 | 25.5 | 30.0 | 21.0 | 29.5 | 20.5 | 25.5 | 25.5 |
| | Total | | 100.0 | 100.0 | 100.0 | 100.0 | 100.0 | 100.0 | 100.0 | 100.0 | 100.0 | 100.0 |
| | (a) Total | | 11.5 | 11.5 | 11.5 | 11.5 | 8.0 | 15.0 | 10.5 | 14.5 | 11.5 | 11.5 |
| | (b) Total | | 2.0 | 2.0 | 2.0 | 2.0 | 1.0 | 3.0 | 2.0 | 2.0 | 2.0 | 2.0 |
| | (c) Total | | 8.0 | 8.0 | 8.0 | 3.0 | 3.0 | 8.0 | 5.0 | 10.0 | 8.0 | 8.0 |
| | ((a) + (b))/(c) | | 1.69 | 1.69 | 1.69 | 1.69 | 1.13 | 2.25 | 2.50 | 1.65 | 1.69 | 1.69 |

TABLE 2

|  |  |  | Comparative Examples | | | | | | | | |
|---|---|---|---|---|---|---|---|---|---|---|---|
|  |  |  | 1 | 2 | 3 | 4 | 5 | 6 | 7 | 8 | 9 |
| Binder | Straight Phenolic Resin |  | 14.0 | 14.0 | 14.0 | 14.0 | 14.0 | 14.0 | 14.0 | 14.0 | 14.0 |
| Fiber Base | Aramid Fiber |  | 5.0 | 5.0 | 5.0 | 5.0 | 5.0 | 5.0 | 5.0 | 5.0 | 5.0 |
| Inorganic Friction Modifier | Zirconium Silicate (Average Particle Diameter = 0.3 μm) Mohs Hardness = 7.5 |  |  |  |  | 6.0 |  |  |  |  |  |
|  | Zirconium Silicate (Average Particle Diameter = 0.5 μm) Mohs Hardness = 7.5 | (a) |  |  |  |  |  |  |  |  |  |
|  | Zirconium Silicate (Average Particle Diameter = 10 μm) Mohs Hardness = 7.5 | (a) | 6.0 | 6.0 |  |  |  | 1.5 | 11.0 | 2.5 | 9.0 |
|  | Zirconium Silicate (Average Particle Diameter = 20 μm) Mohs Hardness = 7.5 | (a) |  |  |  |  |  |  |  |  |  |
|  | Zirconium Silicate (Average Particle Diameter = 30 μm) Mohs Hardness = 7.5 |  |  |  |  |  | 6.0 |  |  |  |  |
|  | Activated Alumina (Average Particle Diameter = 10 μm) Mohs Hardness = 6 | (a) | 5.0 | 5.0 | 5.0 | 5.0 | 5.0 | 5.0 | 5.0 | 5.0 | 5.0 |
|  | Black Iron Oxide (Average Particle Diameter = 1 μm) Mohs Hardness = 6.5 | (a) | 0.5 | 0.5 | 0.5 | 0.5 | 0.5 | 0.5 | 0.5 | 0.5 | 0.5 |
|  | Silicon Carbide (Average Particle Diameter = 10 μm) Mohs Hardness = 9 |  |  |  |  |  | 6.0 |  |  |  |  |
|  | Zeolite | (b) | 2.0 | 2.0 | 2.0 | 2.0 | 2.0 | 0.5 | 5.0 | 2.0 | 2.0 |
|  | Micro Porous Alumina | (b) |  |  |  |  |  |  |  |  |  |
|  | Muscovite |  | 6.0 | 6.0 | 6.0 | 6.0 | 6.0 | 6.0 | 6.0 | 6.0 | 6.0 |
|  | Unbaked Vermiculite |  | 3.0 | 3.0 | 3.0 | 3.0 | 3.0 | 3.0 | 3.0 | 3.0 | 3.0 |
| Carbon Type Lubricant | Artificial Graphite | (c) | 5.0 | 5.0 | 5.0 | 5.0 | 5.0 | 4.0 | 6.0 |  | 8.0 |
|  | Petroleum Coke (Average Particle Diameter = 100 μm) |  |  | 3.0 |  |  |  |  |  |  |  |
|  | Petroleum Coke (Average Particle Diameter = 300 μm) | (c) |  |  |  |  |  |  |  |  |  |
|  | Petroleum Coke (Average Particle Diameter = 450 μm) | (c) |  |  | 3.0 | 3.0 | 3.0 | 3.0 | 3.0 | 3.0 | 4.0 |
|  | Petroleum Coke (Average Particle Diameter = 800 μm) | (c) |  |  |  |  |  |  |  |  |  |
|  | Petroleum Coke (Average Particle Diameter = 1000 μm) |  |  | 3.0 |  |  |  |  |  |  |  |
| Metal Sulfide Type Lubricant | Molybdenum Disulfide |  | 1.0 | 1.0 | 1.0 | 1.0 | 1.0 | 1.0 | 1.0 | 1.0 | 1.0 |
| Organic Friction Modifier | Cashew Dust |  | 12.0 | 12.0 | 12.0 | 12.0 | 12.0 | 12.0 | 12.0 | 12.0 | 12.0 |
|  | Tire Tread Rubber Vulcanized Powder |  | 6.0 | 6.0 | 6.0 | 6.0 | 6.0 | 6.0 | 6.0 | 6.0 | 6.0 |
| pH Adjuster | Calcium Hydroxide |  | 6.0 | 6.0 | 6.0 | 6.0 | 6.0 | 6.0 | 6.0 | 6.0 | 6.0 |
| Remaining Components | Barium Sulfate |  | 25.5 | 25.5 | 25.5 | 25.5 | 25.5 | 32.5 | 16.5 | 34.0 | 18.5 |
|  | Total |  | 100.0 | 100.0 | 100.0 | 100.0 | 100.0 | 100.0 | 100.0 | 100.0 | 100.0 |
|  | (a) Total |  | 11.5 | 11.5 | 5.5 | 5.5 | 5.5 | 7.0 | 16.5 | 8.0 | 14.5 |
|  | (b) Total |  | 2.0 | 2.0 | 2.0 | 2.0 | 2.0 | 0.5 | 5.0 | 2.0 | 2.0 |
|  | (c) Total |  | 5.0 | 5.0 | 8.0 | 8.0 | 8.0 | 7.0 | 9.0 | 3.0 | 12.0 |
|  | ((a) + (b))/(c) |  | 2.70 | 2.70 | 0.94 | 0.94 | 0.94 | 1.07 | 2.39 | 3.33 | 1.38 |

The obtained friction materials were evaluated with respect to the braking performance, the fading resistance, the wear resistance, the adhesive strength between the friction material and the back plate, and the product appearance of the products. The results of the evaluation are shown in TABLE 3 and TABLE 4 while the evaluation standards are shown in TABLE 5 and TABLE 6.

TABLE 3

|  |  | Embodiments | | | | | | | | | |
|---|---|---|---|---|---|---|---|---|---|---|---|
|  |  | 1 | 2 | 3 | 4 | 5 | 6 | 7 | 8 | 9 | 10 |
| Evaluation Result | Braking Performance | ◎ | ◎ | ○ | ◎ | ○ | ◎ | ◎ | ○ | ◎ | ○ |
|  | Fading Resistance | ◎ | ○ | Δ | ◎ | Δ | ◎ | ◎ | Δ | ◎ | Δ |
|  | Wear Resistance | ◎ | ◎ | ◎ | Δ | ◎ | Δ | Δ | ◎ | ◎ | ◎ |

TABLE 3-continued

|  | Embodiments | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Adhesive Strength | ◎ | ◎ | ◎ | ◎ | ◎ | Δ | ◎ | ◎ | Δ | ◎ |
| Friction Material Appearance | ○ | ○ | ○ | ○ | ○ | ○ | ○ | ○ | ○ | ○ |

Figure No. 000004

TABLE 4

|  |  | Comparative Examples | | | | | | | | |
| --- | --- | --- | --- | --- | --- | --- | --- | --- | --- | --- |
|  |  | 1 | 2 | 3 | 4 | 5 | 6 | 7 | 8 | 9 |
| Evaluation Result | Braking Performance | ◎ | Δ | Δ | ◎ | ◎ | Δ | ◎ | ◎ | Δ |
|  | Fading Resistance | ◎ | Δ | X | ◎ | ◎ | X | ◎ | ◎ | X |
|  | Wear Resistance | ◎ | ◎ | ◎ | X | X | ◎ | Δ | X | ◎ |
|  | Adhesive Strength | X | ○ | ◎ | ◎ | ◎ | ◎ | X | ◎ | ◎ |
|  | Friction Material Appearance | ○ | X | ○ | ○ | ○ | ○ | ○ | ○ | ○ |

Figure No. 000005

TABLE 5

| Evaluation Items | Braking Effectiveness | Fading Resistance | Wear Resistance | Adhesive Strength |
| --- | --- | --- | --- | --- |
| Evaluation Method | JASO C406 Passenger Car - Braking Device - Dynamometer Test Procedures | | JASO C427 Automobile Parts - Brake Lining and Disc Brake Pad - Wear Test Procedure on Inertia Dynamometer | JIS D4422 Automobile Parts - Drum Brake Shoe Assemblies and Disc Brake Pad - Shear Test Procedure (kN/cm2) |
|  | Second Effectiveness Test Average Friction Coefficient Initial Braking Speed: 130 km/h Braking Deceleration: 0.6 G | Fist Fade Recovery Test Minimum Friction Coefficient | Wear Test at Respective Temperature Wear of Friction Material Braking Temperature; 100 centigrade Brake Cycle: 1000 Cycles (mm) |  |
| Evaluation Standard ◎ | 0.35 or more | 0.20 or more | less than 0.10 | 0.55 or more |
| ○ | 0.30 or more less than 0.35 | 0.18 or more less than 0.20 | 0.10 or more less than 0.15 | 0.50 or more less than 0.55 |
| Δ | 0.25 or more less than 0.30 | 0.15 or more less than 0.20 | 0.15 or more less than 0.20 | 0.45 or more less than 0.50 |
| X | less than 0.25 | less than 0.15 | 0.20 or more | less than 0.45 |

Figure No. 000006

TABLE 6

| Evaluation Items | Product Appearance |
| --- | --- |
| Evaluation Method | Visually Checking the Existence of Wrinkle and Crack on the Friction Material Surface |
| Evaluation Standard ○ | No Wrinkle or Crack |
| X | Wrinkle or Crack |

Figure No. 000007

INDUSTRIAL APPLICABILITY

This invention is able to provide the friction material used for the disc brake pad, manufactured by forming the NAO friction material composition, wherein the friction material is able to secure required braking performance, fading resistance, and wear resistance, and the adhesive strength between the friction material and the back plate and the product appearance thereof is good and the cost thereof is low while satisfying laws and regulations relating to the required amount of the content of the copper component contained therein. Therefore, the friction material in this invention is extremely high practical value.

The invention claimed is:

1. A friction material for a disc brake pad, which is manufactured by forming a non-asbestos-organic friction material composition including no copper component, wherein said friction material composition includes no titanate, but includes (a) 8-15 volume % of an inorganic friction modifier having an average particle diameter of 0.5-20 μm and a Mohs hardness of 5-8 relative to a total amount of the friction material composition, (b) 1-3 volume % of a porous inorganic friction modifier having a micro porous structure relative to the total amount of the friction material composition, and (c) 5-10 volume % of a carbonaceous lubricant, where said carbonaceous lubricant includes 2-4 volume % of coke relative to the total amount of the friction material composition, and an average particle diameter of coke is 300-800 μm while the content of the inorganic friction modifier (a), (b), and the carbonaceous lubricant (c) satisfies a following formula: $1.0 \leq ((a)+(b))/(c) \leq 2.5$.

2. The friction material according to claim 1, wherein the porous inorganic friction modifier having the micro porous structure is zeolite.

* * * * *